US006951209B2

(12) United States Patent
Yanase et al.

(10) Patent No.: US 6,951,209 B2
(45) Date of Patent: Oct. 4, 2005

(54) FUEL VAPOR PROCESSING SYSTEM

(75) Inventors: Taiki Yanase, Saitama (JP); Hisayuki Gouma, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/657,788

(22) Filed: Sep. 8, 2003

(65) Prior Publication Data

US 2004/0055582 A1 Mar. 25, 2004

(30) Foreign Application Priority Data

Sep. 11, 2002 (JP) .................................... 2002-265788

(51) Int. Cl.[7] .................................... F16K 17/04
(52) U.S. Cl. .................... 123/516; 137/512.2; 137/587
(58) Field of Search .................... 123/516; 137/202, 137/565.17, 512.2, 587

(56) References Cited

U.S. PATENT DOCUMENTS 5,590,697 A * 1/1997 Benjey et al. ................ 141/59
5,640,993 A * 6/1997 Kasugai et al. ............. 137/587
5,769,057 A * 6/1998 Hashimoto et al. ......... 123/516
5,782,258 A * 7/1998 Herbon et al. ................ 137/43
6,405,747 B1 * 6/2002 King et al. ................. 137/202
6,655,403 B2 * 12/2003 Mills ............................ 137/2

* cited by examiner

*Primary Examiner*—Thomas Moulis
(74) *Attorney, Agent, or Firm*—Carrier, Blackman & Associates, P.C.; Joseph F. Carrier; William D. Blackman

(57) ABSTRACT

In a fuel vapor processing system, a float valve and a check valve are provided in upper parts of a fuel tank to conduct fuel vapor to a canister via a fuel vapor passage. The check valve includes a low set-pressure valve and high set-pressure valve, and operates in two stages so that the internal pressure of the fuel tank can be favorably controlled by the opening of the low set-pressure valve when the fuel tank is being filled to full so that the sensor associated with the fill nozzle can successfully detect a tank full state, and any excessive rise in the internal pressure of the fuel tank typically caused by a high temperature of the surrounding environment can be avoided by the opening of the high set-pressure valve.

5 Claims, 4 Drawing Sheets

FUEL VAPOR PROCESSING SYSTEM

TECHNICAL FIELD

The present invention relates to a fuel vapor processing system that processes fuel vapor produced in a fuel tank by forwarding it to a canister.

BACKGROUND OF THE INVENTION

A conventional fuel vapor processing system for processing fuel vapor produced from an automotive fuel tank is illustrated in FIG. 6, Such a system is disclosed for instance in Japanese patent application No. 2002-57054. In this system, an upper part of a fuel tank 1 communicates with a canister 2 via a fuel vapor passage 3. In this case, the upper part of the fuel tank 1 consists of two levels. The fuel tank end of the fuel vapor passage 3 is branched into a first branch passage 3*a* that communicates with the lower level of the fuel tank upper part and a second branch passage 3*b* that communicates with the upper level of the fuel tank upper part. The lower level of the fuel tank upper part is provided with a float valve 4 that communicates with the first branch passage 3*a*, and the upper level of the fuel tank upper part is provided with a cut valve 5 that communicates with the second branch passage 3*b*. The fuel tank 1 is additionally provided with a fill pipe 9 for conducting fuel from a fill nozzle G of a fuel pump into the fuel tank 1.

The float valve 4 comprises a valve member 4*a* that starts floating on the fuel surface when the fuel tank 1 is filled nearly to full, and a port 4*b* provided at the corresponding end of the first branch passage 4*a* is closed by the valve member 4*b* when the fuel tank 1 is full. The cut valve 5 comprises a valve member 5*a* that floats on the fuel surface when the fuel tank 1 has tilted to a certain extent, and a port 5*b* provided at the corresponding end of the second branch passage 4*b* that is closed by the valve member 4*b* when it floats.

A check valve 21 is provided in an intermediate point of the second branch passage 3*b*. When the fuel tank 1 is filled to full and float valve 4 has closed the first branch passage 3*a*, this check valve 21 permits the internal pressure of the fuel tank 1 to rise to such an extent that the fuel level in the fill pipe 9 rises and activates a sensor of the fill nozzle G to automatically stop the supply of fuel from the nozzle G. When the internal pressure of the fuel tank 1 has risen beyond a prescribed level owing to the additional rise in the fuel surface level, the check valve 21 opens to conduct the fuel vapor to the canister 2 and prevents the fuel vapor from escaping out of the fill pipe 9.

In such a fuel vapor processing system, because the rise in the internal pressure of the fuel tank 1 when the fuel tank 1 is filled full is relative small, the opening pressure of the check valve 21 is set relatively low so that the fuel vapor in the fuel tank 1 when it is filled full may be conducted to the canister 2 via the check valve 21, and absorbed by charcoal or other material filled in the canister 2. Thereby, when filling fuel into the fuel tank, the fuel vapor is prevented from escaping to the atmosphere via the fill pipe 9.

Even when fuel is not being filled into the fuel tank 1, the internal pressure of the fuel tank 1 may rise if the fuel tank 1 is placed in a high temperature environment. In such a case also, the check valve 21 opens and allows the fuel vapor in the fuel tank 1 to be absorbed by the canister 2. When the surrounding temperature is high, a significant amount of fuel vapor can be produced. Therefore, the opening area of the check valve 21 is required to be large enough to accommodate a large flow rate of fuel vapor resulting from such an event.

However, some of the existing fuel fill nozzles are equipped with a sensor that detects the rising of the froth or foam on the fuel surface in the fill pipe 9 to detect the tank full state and automatically stop the filling of fuel. When the opening area of the check valve 21 is increased as mentioned above, the opening of the check valve 21 may so rapidly stop the rise in the internal pressure of the fuel tank 1 that the froth fails to rise in the fill pipe and the timing of detecting the tank full state may be delayed when a fuel nozzle equipped with such a sensor is used. Such a delay in detecting the tank full state may lead to spilling fuel.

BRIEF SUMMARY OF THE INVENTION

In view of such problems of the prior art, a primary object of the present invention is to provide a fuel vapor processing system that can quickly remove any excessive internal pressure of a fuel tank without interfering with the capability of a sensor of a fuel fill nozzle to detect a tank full state.

A second object of the present invention is to provide a fuel vapor processing system that can quickly release any remove internal pressure of a fuel tank without releasing the fuel vapor to the atmosphere.

A third object of the present invention is to provide an improved fuel vapor processing system that can be installed without substantially altering the existing design.

According to the present invention, at least one of these objects can be accomplished by providing a fuel vapor processing system, comprising: a fuel tank; a canister for absorbing fuel vapor produced from the fuel tank; a first passage communicating a nominal full level of the fuel tank at one end thereof with the canister at the other end thereof; a float valve provided at the fuel tank end of the first passage; a second passage communicating a part slightly higher than the nominal full level of the fuel tank at one end thereof with the canister at the other end thereof; a check valve provided at the fuel tank end of the second passage; wherein the check valve comprises a low set-pressure valve that opens at a first threshold pressure P1 substantially corresponding to a tank full state, a high set-pressure valve that opens at a second threshold pressure P2 higher than the first threshold pressure P1 and is connected in parallel with the low set-pressure valve, the high set-pressure valve being able to provide a larger flow rate than the low set-pressure valve.

Thus, the check valve operates in two stages so that the internal pressure of the fuel tank can be favorably controlled by the opening of the low set-pressure valve when the fuel tank is being filled to full so that the sensor associated with the fill nozzle can successfully detect a tank full state, and any excessive rise in the internal pressure of the fuel tank typically caused by a high temperature of the surrounding environment can be avoided by the opening of the high set-pressure valve. Therefore, the present invention can prevent the spilling of fuel that could be otherwise caused by the failure of the sensor to detect a tank full state, and releasing of fuel vapor from the fill pipe and excessive rise in the internal pressure of the fuel tank that could be otherwise cause by the failure of the check valve to conduct the fuel vapor to the canister at an adequate flow rate.

The low set-pressure valve and high set-pressure valve may be disposed either coaxially to each other or laterally one next to the other. According to a preferred embodiment of the present invention, each of the low set-pressure valve and high set-pressure valve is provided with a valve chamber communicating with a canister end of the corresponding passage, a port communicating with a fuel tank end of the corresponding passage, a valve member adapted to selectively close the port, and a spring member resiliently urging the valve member against the port. A highly compact structure can be achieved when the valve member of the high set-pressure valve is cup-shaped, and defines the port of the low set-pressure valve in a bottom wall thereof, and the valve member and spring member of the low set-pressure valve is received inside the valve member of the high set-pressure valve.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
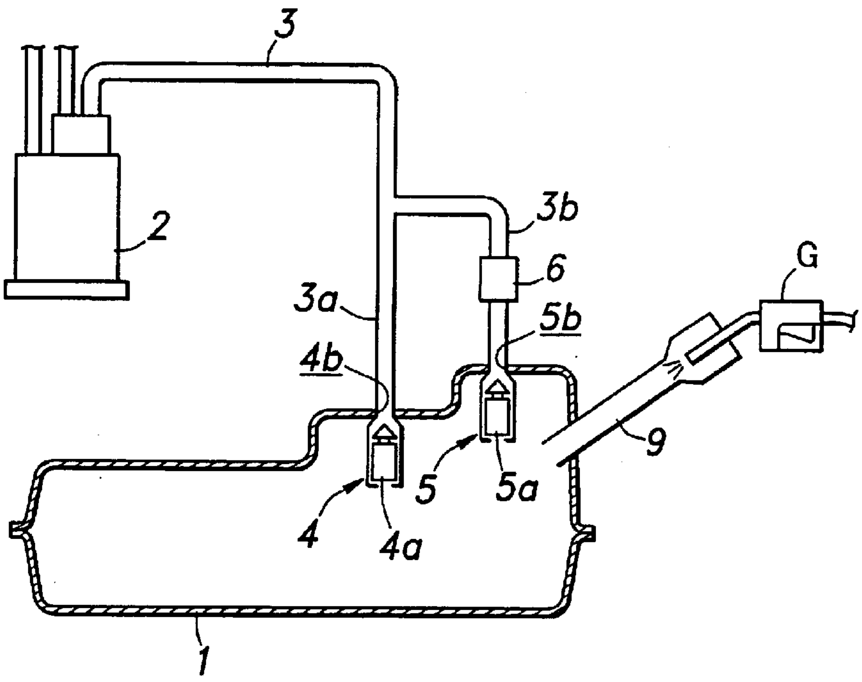
FIG. 1 is a schematic overall view of a fuel vapor processing system embodying the present invention.
Figure 6:
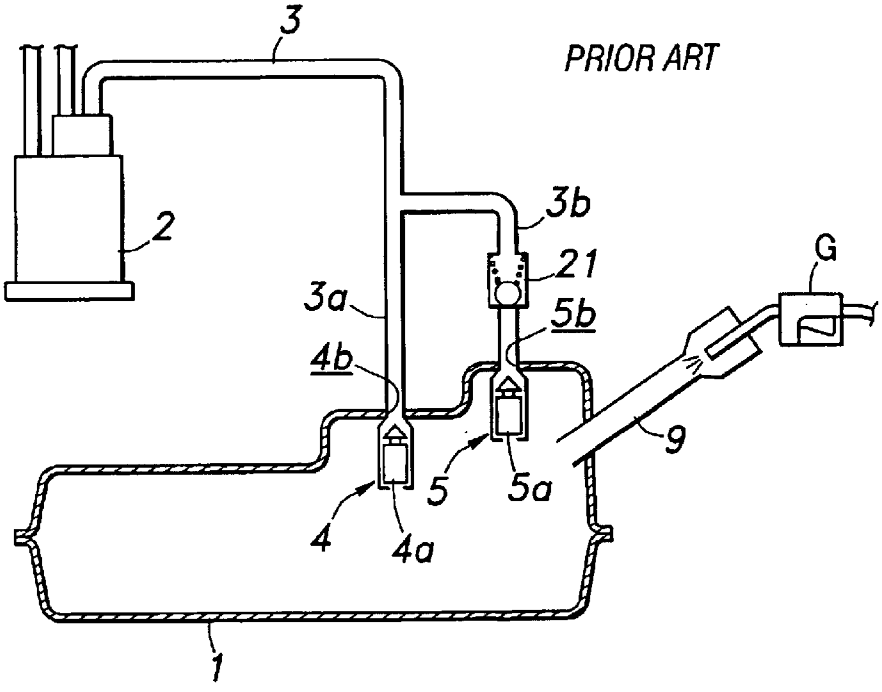
FIG. 6 is a schematic overall view of a conventional fuel vapor processing system.

FIG. 1 is a diagram showing an overall structure of the fuel vapor processing system embodying the present invention, in which the parts corresponding to those of the prior art shown in FIG. 6 are denoted with like numerals without repeating the description of such parts. Referring to FIG. 1, a fuel tank 1 and a canister 2 are connected to each other via a fuel vapor passage 3, which is branched into a pair of branch passages 3*a* and 3*b* at the end communicating with the fuel tank 1. The first branch passage 3*a* is selectively closed by a float valve 4 provided at the fuel tank end of the first branch passage 3*a*, and the second branch passage 3*b* is selectively closed by a cut valve 5 provided at the fuel tank end of the second branch passage 3*b*.

Figure 2:
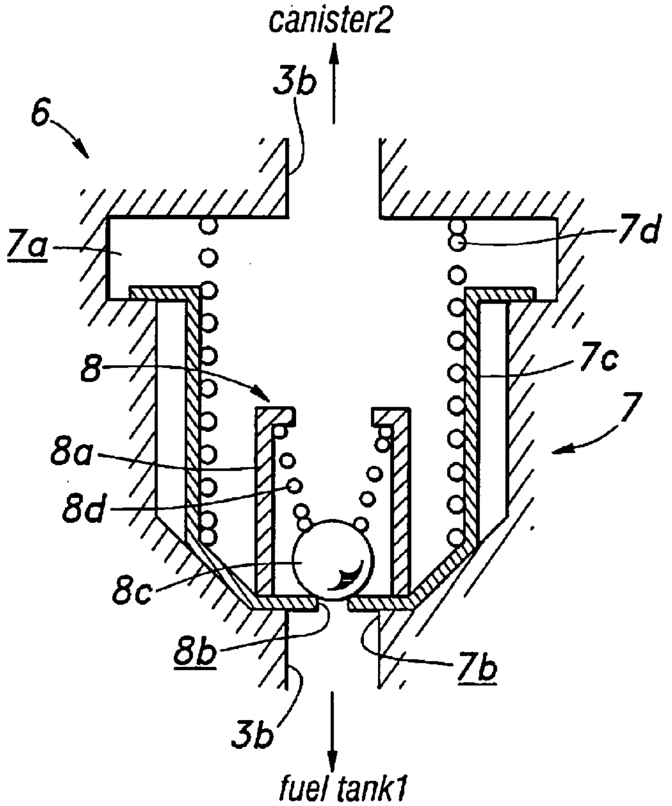
FIG. 2 is an enlarged sectional view of the check valve.

An intermediate part of the second branch passage 3*b* is provided with a two-stage check valve 6 which comprises a high set-pressure valve 7 and a low set-pressure valve 8 incorporated in the high set-pressure valve 7 as shown in FIG. 2. The high set-pressure valve 7 comprises a valve chamber 7*a* communicating with the canister end of the second branch passage 3*b*, a port 7*b* communicating with the fuel tank end of the second branch passage 3*b*, a cup-shaped valve member 7*c* axially slidably received in the valve chamber 7*a* so as to selectively close the port 7*b*, and a compression coil spring 7*d* resiliently urging the valve member 7*c* in the direction to close the port 7*b*.

The low set-pressure valve 8 comprises a cylindrical valve housing 8*a* formed inside the valve member 7*c* and integrally attached thereto, a port 8*b* formed in the bottom wall of the valve member 7*c* so as to communicate the valve housing 8*a* with the fuel tank end of the second branch passage 3*b*, a ball-shaped valve member 8*c* received in the valve housing 8*a* so as to selectively close the port 8*b*, and a compression coil spring 8*d* resiliently urging the valve member 8*c* in the direction to close the port 8*b*. The interior of the valve housing 8*a* communicates with the valve chamber 7*a* of the high set-pressure valve 7. The first prescribed pressure P1 at which the valve member 8*c* is pushed open against the spring force of the compression coil spring 8*d* is smaller than the second prescribed pressure P2 at which the valve member 7*c* is pushed open against the spring force of the compression coil spring 7*d* (P1<P2).

Under normal condition or when the internal pressure of the fuel tank 1 is not higher than that of the canister 2, the ports 7*b* and 8*b* of the check valve 6 are closed by the valve members 7*c* and 8*c*, respectively, as illustrated in FIG. 2. When the fuel tank 1 is filled full, the first branch passage 3*a* is closed by the float valve 4, and any additional filling of fuel causes the internal pressure of the fuel tank 1 to rise. The resilient biasing force of the compression coil spring 8*d* is selected in such a manner that the pressure rise due to the filling of the fuel tank beyond the tank full state is enough to push open the valve member 8*c* against the spring force of the compression coil spring 8*d*. Therefore, when the fuel tank is filled beyond the tank full state, the low set-pressure valve 8 opens (see FIG. 3*a*).

Figure 3A:
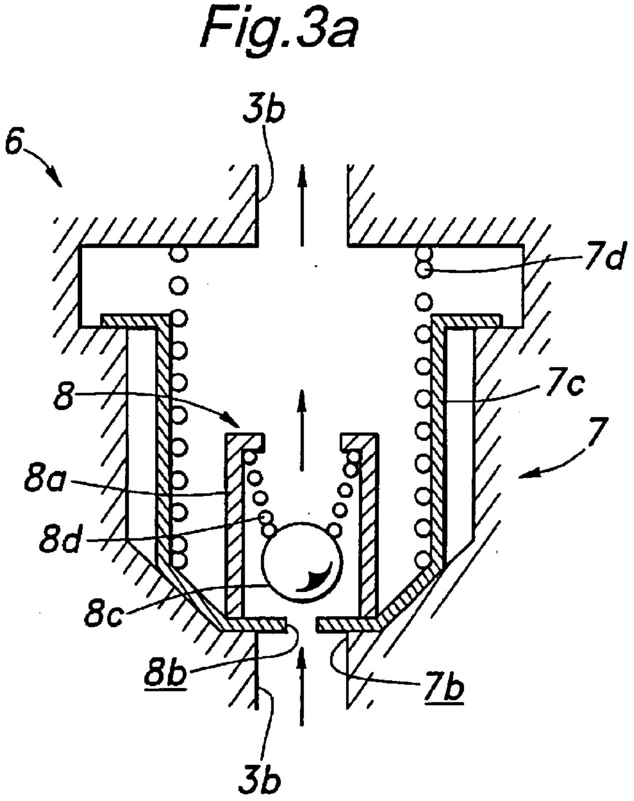
FIG. 3*a* is a view similar to FIG. 2 showing the state when the low set-pressure valve has opened.
Figure 3B:
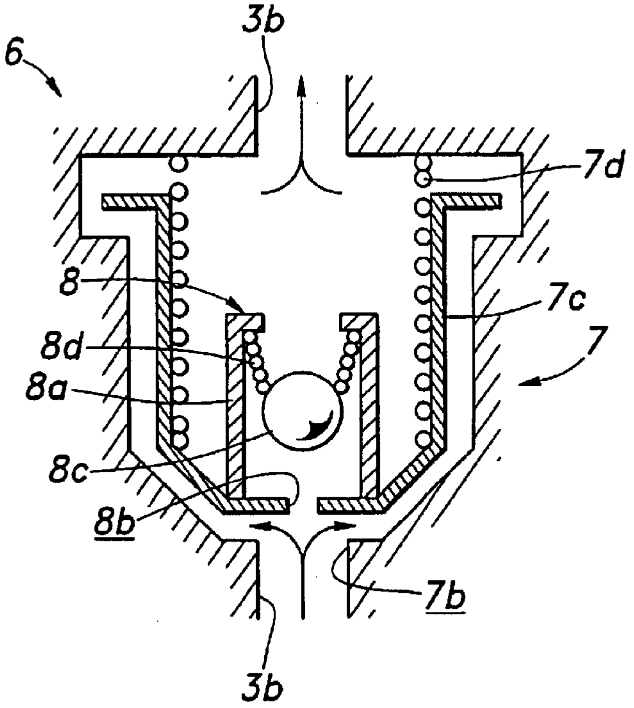
FIG. 3*b* is a view similar to FIG. 2 showing the state when the high set-pressure valve has also opened.

Thus, the fuel vapor which is displaced from the fuel tank 1 by the filling of fuel into the fuel tank 1 beyond the tank full state is allowed to be conducted to the canister 2 as indicated by the arrows in FIG. 3*a*, instead of the fuel fill pipe 9 so that the fuel vapor is successfully absorbed by the canister 2 and prevented from being released to the atmosphere from the fill pipe 9. By reducing the opening area of the port 8*b*, the flow rate of the fuel vapor directed to the canister 2 is controlled. Therefore, a certain level of pressure rise can be preserved in the fuel tank 1 so that the froth of fuel is allowed to rise in the fill pipe 9 during the time of filling the tank beyond the tank full state, and the sensor equipped to the fuel fill nozzle G is enabled to detect the rise of the froth and shut off the supply of fuel without any problem.

The internal pressure of the fuel tank 1 may rise to a significant level even when fuel is not being filled into the fuel tank 1 if the surrounding temperature is high. Such an excessive pressure is desired to be removed as soon as possible, but it is not desirable to release fuel vapor to the atmosphere to remove the high pressure. Such a pressure rise opens the low set-pressure valve 8, but the flow rate is so limited that the pressure rise may continue.

This problem is resolved by the high set-pressure valve 7 provided in the check valve 6. When the internal pressure of the fuel tank 1 reaches a prescribed pressure P2 higher than the set pressure P1 of the low set-pressure valve 8, this high set-pressure valve 7 opens. When the high set-pressure valve 7 opens, the vapor can flow across a relatively large sectional area surrounding the valve member 7*c* and the check valve 6 can thereby accommodate a relatively large flow rate in addition to that effected by the open state of the low set-pressure valve 8. As a result, even when the internal pressure of the fuel tank 1 rises for other reasons than filling fuel into the fuel tank beyond the tank full state, the high pressure can be released to the canister 2 via the fuel vapor passage 3. The fuel vapor is absorbed by the canister 2, and would not be released to the atmosphere.

The check valve 6 that opens in two stages as described above was made particularly compact by incorporating the low set-pressure valve 8 into the high set-pressure valve 7. Therefore, the check valve 6 can be mounted without requiring no more space than the conventional counterpart, and can also be used in place of a conventional counterpart without requiring any substantial change to the existing design.

In the check valve 6 of the illustrated embodiment, the low set-pressure valve 8 was incorporated into the high set-pressure valve 7, but the check valve of the present invention is not limited to this example but may be designed in any other way possible as long as it combines a first valve that opens at a relatively low pressure and a second valve that opens at a relatively high pressure.

Figure 4:
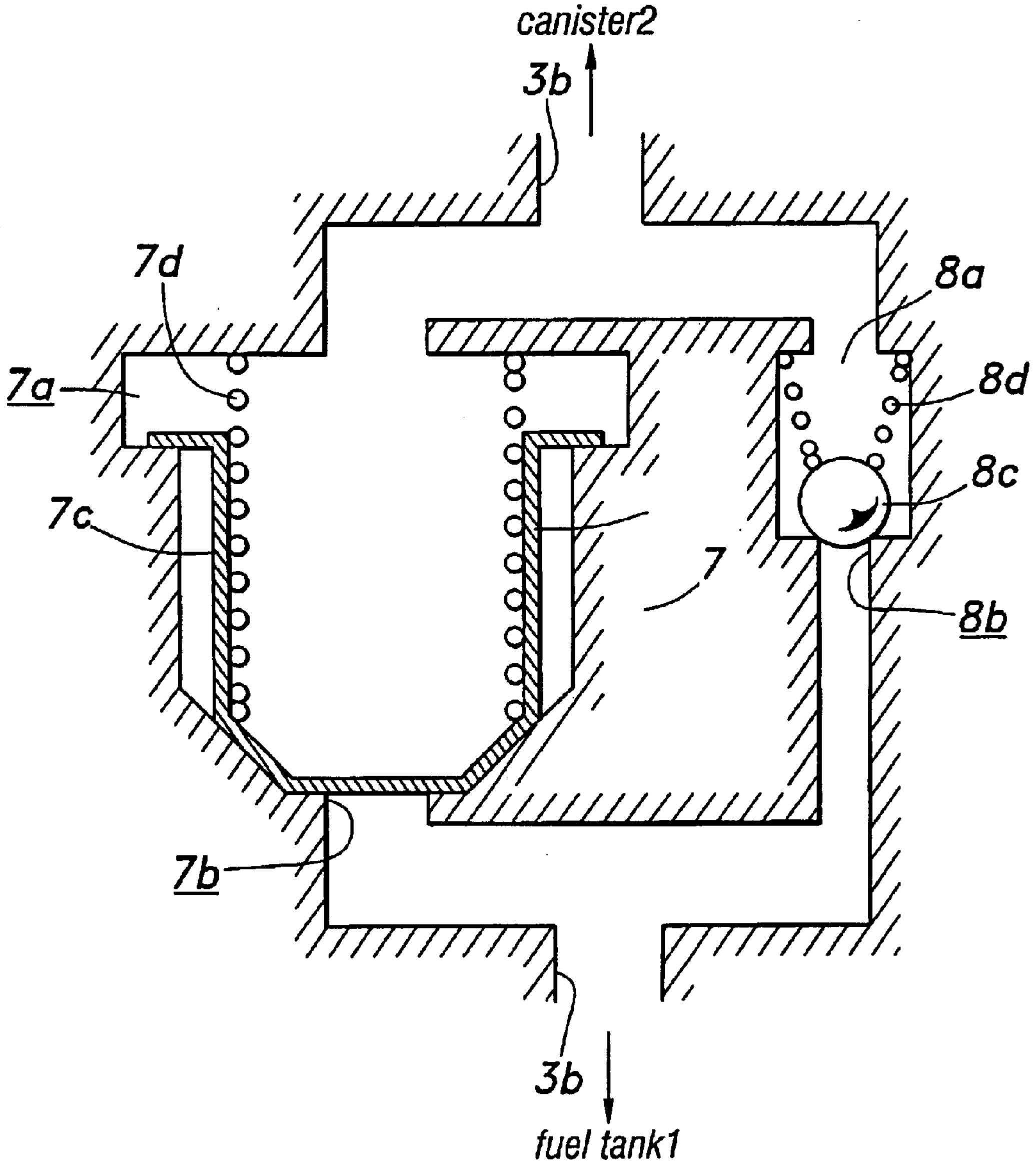
FIG. 4 is a view similar to FIG. 2 showing a second embodiment of the present invention.

FIG. 4 shows another embodiment of the check valve 6. In FIG. 4, the parts corresponding to those of the previous embodiment are denoted with like numerals without repeating the description of such parts. In this case, a low set-pressure valve 8 and high set-pressure valve 7 are arranged in parallel with each other. The bottom wall of the valve member 7*c* of the high set-pressure valve 7 is closed. The ports 7*b* and 8*b* of these valves on the side of the fuel tank 1 are commonly connected to the fuel tank end of the second branch passage 3*b*, and the valve chamber 7*a* and valve housing 8*a* of these valves on the side of the canister 2 are commonly connected to the canister end of the second branch passage 3*b*.

This also provides an action similar to that of the previous embodiment by opening the low set-pressure valve 8 upon the occurrence of a slight pressure rise resulting from the filling of the fuel tank to full and opening the high set-pressure valve 7 upon the occurrence of a substantial pressure rise resulting from a high temperature or a cause other than filling the tank full. According to this embodiment, because the two valves 7 and 8 can open independently from each other, the threshold pressures P1 and P2 can be set at a high precision, and the manufacturing process can be simplified.

Figure 5:
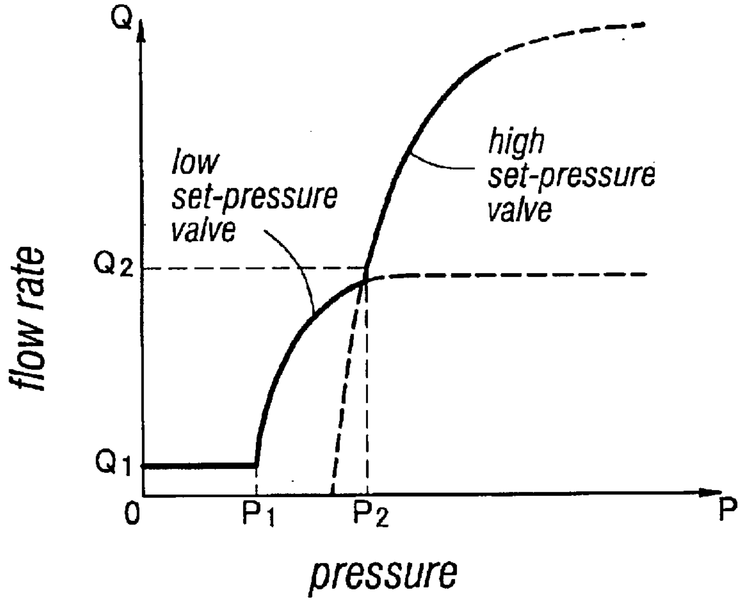
FIG. 5 is a graph showing an alternate relationship between the pressure and flow rate in the check valve.

The low set-pressure valve 8 started opening at pressure P1 and the high set-pressure valve 7 started opening at pressure P2 in a step-wise fashion in the foregoing embodiment, but they may be adapted to open gradually so as to progressively increase the flow rate as the pressure rises as indicated by the graph of FIG. 5. In the graph, the abscissa corresponds to the pressure (gauge pressure) inside the fuel tank 1, and the ordinate corresponds to the rate of flow that passes through the check valve 6. As indicated by the graph, the high set-pressure valve 7 and low set-pressure valve 8 remain closed when the pressure is lower than the first threshold pressure P1. Even in this state, there is a slight leak flow at the rate of Q1. When the pressure has reached the first threshold pressure P1, only the low set-pressure valve 8 opens, and the fuel vapor passes through the check valve 6 at a flow rate which progressively increases with the rise in the pressure. The increase flow rate eventually diminishes as the pressure approaches the second threshold pressure P2. When the pressure has reached the second threshold pressure P2, the high set-pressure valve 7 also opens, and the fuel vapor passes through the check valve 6 at the flow rate Q2. As the pressure rises further, the opening of the high set-pressure valve 7 progressive increases, and so does the flow rate. The second threshold pressure P2 should be selected to be equal to that encountered when the tank is filled full or slightly higher.

By thus progressively increasing the flow rate with the rise in pressure, the canister can be absorb the fuel vapor from an early stage of filling up the fuel tank 1. Also, because the high set-pressure valve 7 is adapted to accommodate a relatively large flow rate for a given rise in pressure, the pressure rise owing to a high temperature condition can be controlled in a relatively promptly.

Although the present invention has been described in terms of preferred embodiments thereof, it is obvious to a person skilled in the art that various alterations and modifications are possible without departing from the scope of the present invention which is set forth in the appended claims.

What is claimed is:

1. A fuel vapor processing system, comprising:

a fuel tank;

a canister for absorbing fuel vapor produced from said fuel tank;

a first passage communicating a nominal full level of said fuel tank at one end thereof with said canister at the other end thereof;

a float valve provided at the fuel tank end of said first passage;

a second passage communicating a part slightly higher than said nominal full level of said fuel tank at one end thereof with said canister at the other end thereof;

a check valve provided at the fuel tank end of said second passage;

wherein said check valve comprises a low set-pressure valve that opens at a first threshold pressure P1 substantially corresponding to a tank full state, a high set-pressure valve that opens at a second threshold pressure P2 higher than said first threshold pressure P1 and is connected in parallel with said low set-pressure valve, said high set-pressure valve being able to provide a larger flow rate than said low set-pressure valve.

2. A fuel vapor processing system according to claim 1, wherein said low set-pressure valve and high set-pressure valve are disposed coaxially to each other.

3. A fuel vapor processing system according to claim 1, wherein said low set-pressure valve and high set-pressure valve are disposed laterally one next to the other.

4. A fuel vapor processing system according to claim 1, wherein each of said low set-pressure valve and high set-pressure valve is provided with a valve chamber communicating with a canister end of the corresponding passage, a port communicating with a fuel tank end of the corresponding passage, a valve member adapted to selectively close said port, and a spring member resiliently urging said valve member against said port.

5. A fuel vapor processing system according to claim 4, wherein said valve member of said high set-pressure valve is cup-shaped, and defines said port of said low set-pressure valve in a bottom wall thereof, and said valve member and spring member of said low set-pressure valve is received inside said valve member of said high set-pressure valve.

* * * * *

UNITED STATES PATENT AND TRADEMARK OFFICE

CERTIFICATE OF CORRECTION

PATENT NO. : 6,951,209 B2 Page 1 of 1
APPLICATION NO. : 10/657788
DATED : October 4, 2005
INVENTOR(S) : Yanase et al.

It is certified that error appears in the above-identified patent and that said Letters Patent is hereby corrected as shown below:

Title page,
Item [75], Inventors, change "Gouma" to -- Goma --.
Item [74], *Attorney, Agent, or Firm*, change "Joseph F. Carrier" to -- Joseph P. Carrier --.

Column 1,
Line 11, change "FIG. 6, Such" to -- FIG. 6. Such --.
Line 51, change "is relative small" to -- is relatively small --.

Column 2,
Line 20, change "quickly release any" to -- quickly release and --.
Line 58, change "otherwise cause by" to -- otherwise caused by --.

Column 4,
Line 5, change "Under normal condition" to -- Under normal conditions --.
Line 62, change "requiring no more" to -- requiring any more --.

Column 5,
Line 53, change "valve 7 progressive increases," to -- valve 7 progressively increases, --.
Line 58, change "canister can be absorb" to -- canister can absorb --.

Column 6,
Line 5, change "controlled in a relatively promptly." to -- controlled relatively promptly. --.
Line 55, change "valve is received" to -- valve are received --.

Signed and Sealed this

Fourth Day of July, 2006

JON W. DUDAS
*Director of the United States Patent and Trademark Office*